United States Patent
Eiben et al.

(10) Patent No.: US 8,648,124 B2
(45) Date of Patent: Feb. 11, 2014

(54) WEATHER-RESISTANT POLYURETHANE CASTING COMPOUNDS, A PROCESS FOR PREPARATION THEREOF AND USE THEREOF

(75) Inventors: Robert Eiben, Lampertheim (DE); Peter Schuster, Altrip (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 13/034,756

(22) Filed: Feb. 25, 2011

(65) Prior Publication Data

US 2011/0263744 A1    Oct. 27, 2011

(30) Foreign Application Priority Data

Mar. 12, 2010   (EP) .................................... 10156413

(51) Int. Cl.
   *C08G 18/22*   (2006.01)

(52) U.S. Cl.
   USPC ............. 521/124; 521/163; 521/174; 528/52; 528/53; 528/55; 528/56; 528/76; 528/85

(58) Field of Classification Search
   USPC .......... 521/124, 163, 174; 528/52, 53, 55, 56, 528/76, 85
   See application file for complete search history.

(56) References Cited

U.S. PATENT DOCUMENTS

| | | | |
|---|---|---|---|
| 4,263,423 A | 4/1981 | Schwindt et al. | |
| 4,886,838 A | 12/1989 | Dewhurst | |
| 5,733,945 A | 3/1998 | Simpson | |
| 6,559,196 B2 * | 5/2003 | Narayan et al. | 521/174 |
| 7,338,983 B2 * | 3/2008 | Simpson et al. | 521/170 |
| 2007/0197362 A1 | 8/2007 | Sakata | |

FOREIGN PATENT DOCUMENTS

| | | |
|---|---|---|
| EP | 0065250 B1 | 8/1986 |
| JP | 2007169432 | 5/2007 |

OTHER PUBLICATIONS

European Search Report from co-pending Application EP12166611 dated Jul. 2, 2012, 2 pages.
European Search Report from co-pending Application EP10156413 dated Aug. 13, 2010, 7 pages.
Fujimoto et al; XP002592716; Thompson Scientific, London, GB; Jul. 5, 2007.

* cited by examiner

*Primary Examiner* — John Cooney
(74) *Attorney, Agent, or Firm* — Michael A. Miller

(57) ABSTRACT

The invention concerns novel weather-resistant polyurethane casting compounds, a process for preparation thereof and use thereof in the building sector.

6 Claims, No Drawings

WEATHER-RESISTANT POLYURETHANE CASTING COMPOUNDS, A PROCESS FOR PREPARATION THEREOF AND USE THEREOF

Novel weather-resistant polyurethane casting compounds, a process for preparation thereof and use thereof.

The invention concerns novel weather-resistant polyurethane casting compounds, a process for preparation thereof and use thereof in the building sector.

The term "polyurethane casting compounds" comprehends polyurethane foams and compact polyurethane articles, i.e. unfoamed articles.

PU casting compounds are widely used, mainly for polyurethane foams used in the building industry as an assembly foam or for insulation.

Where, however, PU casting compounds are exposed to weathering, special catalysis is needed. In addition, no environmentally hazarded substances may leach into the soil. The harmful constituents or descendant products of the catalyst have to be firmly bonded, i.e. they must not elute with water or at least harmless constituents should eluate. Nor may the catalyst speed the weathering.

Sn(II) ricinoleates, known for their diverse applications e.g. in the automotive sector (in the flexible-foam sector), have hitherto been used. However, the foam obtained therewith decomposes badly under weathering influences.

It is an object of the present invention to provide more weather-resistant and ideally also more light-resistant polyurethane casting compounds which are free of the aforementioned disadvantages and have no adverse effects on the environment.

We have found that this object is achieved, surprisingly, by the use of iron(III) acetylacetonate as a catalyst dissolved in at least one diamine or at least one monofunctional polyether polyol in that it renders the corresponding PU casting compounds more weather- and light-resistant. Fe(III) acetylacetonate is in accordance with a 2002/72/EC directive approved in the EU for materials and articles intended to come into contact with food, and hence also satisfies the criterion of environmental compatibility.

The present invention accordingly provides polyurethane casting compounds obtainable by reaction of 100 parts of at least one polyether polyol,
10-80 parts of at least one di- or polyisocyanate in the presence of 0.05-5 parts of the 0.5-10% solution of iron(III) acetylacetonate (Fe(III)Acac) dissolved in
at least one diamine or at least one monofunctional polyether polyol in the presence or absence of water and/or at least one chain-extending agent.

Useable polyether polyols for the purposes of the invention are bi-/tri- or polyfunctional polyether polyols having an OH number in the range from 20 to 85 and a molecular weight in the range from 2000 to 10 000.

The polyether polyols useable for the purposes of the invention preferably have an average hydroxyl functionality of 2 (bifunctional) to 3 (trifunctional) and consist of at least one polyhydroxy polyether of the molecular weight range 2000 to 10 000, preferably 3000 to 6000. These particulars concerning the molecular weight are based on the molecular weight computable from OH functionality and OH content.

Suitable polyhydroxy polyethers are the products known per se from polyurethane chemistry of alkoxylating preferably di- or trifunctional starter molecules or mixtures of such starter molecules. Suitable starter molecules are for example water, ethylene glycol, diethylene glycol, propylene glycol, trimethylolpropane or glycerol. Alkylene oxides used for alkoxylation are in particular propylene oxide and ethylene oxide, and these alkylene oxides can be reacted in any order and/or as a mixture under the reaction conditions familiar to a person skilled in the art, see exemplary EP-A 0652 250.

Similarly, $NH_2$-terminal polyether polyols of the Jeffamin® type from Huntsman International LLC are useable.

Preference is given to the following polyether polyols in the realm of the invention:

bifunctional polyether polyol and also trifunctional polyether polyol having OH numbers between 20 and 50 or mixtures thereof, for example polyether diol of molecular weight 4000, obtained by propoxylation of propylene glycol and subsequent ethoxylation of the propoxylation product (PO/EO weight ratio=70:30), polyether triol of molecular weight 6200, obtained by propoxylation of trimethylolpropane and subsequent ethoxylation of the propoxylation product (PO/EO weight ratio=80:20), polyether triol of molecular weight 4800, obtained by propoxylation of trimethylolpropane and subsequent ethoxylation of the propoxylation product (PO/EO weight ratio=85:15), and also polyether triol of molecular weight 6000, obtained by propoxylation of trimethylolpropane and subsequent ethoxylation of the propoxylation product (PO/EO weight ratio=85:15) and grafted with 20% by weight based on total weight of styrene/acrylonitrile (weight ratio=40:60).

Commercially available polyols, for example the polyols available from Bayer MaterialScience AG under the names of Arcol®, Desmophen®, Hyperlite®, Baygal® or Ultracel® are also useable.

All known aliphatic and also aromatic isocyanates are useable as di- or polyisocyanates for the purposes of the invention.

The preferred representatives of these aromatic isocyanates are:
tolylene diisocyanate (TDI),
diphenylmethane diisocyanate (MDI) and/or
polymeric diphenylmethane diisocyanate (PMDI) and
as aliphatic isocyanates:
4,4'-diisocyanatodicyclohexylmethane (H12MDI) and also its derivatives and/or isocyanates based on hexamethylene diisocyanate (HMDI), for example trimerisates, HMDI uretdiones, allophanates, isocyanurates, biurets etc., wherein the proportion of HMDI is preferably <0.15% by weight (monomer free) and/or isocyanates based on isophorone diisocyanate (IPDI), for example trimerisates, allophanates, IPDI uretdiones, etc., wherein the proportion of IPDI is preferably <0.15% by weight (monomer free).

Commercially available products are concerned here, available for example from Bayer MaterialScience AG under the trade name Desmodur® and Baymidur®, from BASF AG under the trade name Basonat® and from Evonik AG under Vestanat®.

The compounds used as di- or polyisocyanates for the purposes of the invention are preferably liquid at 20° C. and have an NCO content of 10% to 33.6% and preferably of 20% to 30% by weight.

They may also comprise at least one, optionally chemically modified polyisocyanate or polyisocyanate mixture of the diphenylmethane series. This is to be understood as meaning more particularly 4,4'-diisocyanatodiphenylmethane, its technical-grade mixtures with 2,4'-diisocyanatodiphenylmethane with or without 2,2'-diisocyanatodiphenylmethane, mixtures of these diisocyanates with their higher homologues, as generated in the phosgenation of aniline-formaldehyde condensates and/or obtained in the distillative workup of such phosgenation products. The aforementioned chemical modification of these polyisocyanates comprises more particularly the familiar urethane modification, for example via reaction of up to 30 equivalent percent of the NCO groups present with polypropylene glycols of a maximum molecular weight of 700, or a conventional carbodiimidization of up to 30% of the NCO groups present.

Preference is further given to the following polyisocyanates, for example a tripropylene glycol-liquefied 4,4'-diphenylmethane diisocyanate having an NCO content of 23%, NCO prepolymers having an NCO content of 20.2%, obtained by reaction of (i) 56 parts by weight of 4,4'-diisocyanatodiphenylmethane (4,4'-MDI) and 1 part by weight of a modified 4,4'-MDI having an NCO content of 30%, obtained by concurrent carbodiimidization of the NCO groups, with (ii) a mixture of 21 parts by weight of polypropylene glycol of OH number 56 and 6.7 parts by weight of tripropylene glycol; polyisocyanate mixtures having an NCO content of 28% and a viscosity (25° C.) of 130 mPas consisting of equal parts by weight (i) of a polyisocyanate having an NCO content of 24.5% and a viscosity (25° C.) of 500 mPa·s, obtained by phosgenation of an aniline-formaldehyde condensate and subsequent reaction of the phosgenation product with polypropylene glycol of OH number 515, and (ii) a polyisocyanate mixture of the diphenylmethane series having an NCO content of 31.5% and containing diisocyanatodiphenylmethane isomers at 60% (94% of 4,4-, 5% of 2,4- and 1% of 2,2'-isomer) and polynuclear homologues at 40%.

The iron(III) acetylacetonate used according to the invention comprises a commercially available substance, for example from Sigma-Aldrich. The iron(III) acetylacetonate is preferably used as a 0.05-10% solution in the diamine or monofunctional polyol.

The diamine for the purposes of the invention comprises compounds of the formula

NHR—R'—NHR", where R and R"=methyl, ethyl, propyl; R and R" can each be the same or different; and R'=$C_1$-$C_{18}$-alkylene-, $C_6$-arylene-$C_{12}$-arylene or $C_7$-$C_{13}$-alkyarylene.

N,N'-Bis(secbutylamino)diphenylmethane is particularly preferred here.

N,N'-Bis(secbutylamino)diphenylmethane is again a commercially available substance, obtainable from Albemarle Corp. as Ethacure® 420 for example.

The monofunctional polyol for the purposes of the invention preferably comprises monofunctional polyols based on ethylene oxide, for example polyethylene glycol mono-$C_1$-$C_{18}$-alkyl ether, for example monomethyl ether or monoethyl ether, available from Clariant International Ltd. or polyethylene/polypropylene glycol mono-$C_1$-$C_{18}$-alkyl ether.

In a further, similarly preferred embodiment of the present invention, the polyurethane casting compounds comprise further, auxiliary and additive agents, for example stabilizers or else miscellaneous halogen-free blowing agents, or particularly water, which is used optionally in an amount of 0% up to 5% by weight, based on the weight of the polyether polyol.

The chain-extending agents used for the purposes of the invention (crosslinkers) are preferably difunctional and have a molecular weight in the range from 62 to 1999 and preferably in the range from 62 to 400. When no defined compounds are concerned, this statement concerning the molecular weight likewise refers to the value computed from OH functionality and OH content.

The preferred chain-extending agents include simple dihydric alcohols with a molecular weight below 200, for example ethylene glycol, diethylene glycol, dipropylene glycol, 1,4-butanediol, 1,6-hexanediol or mixtures of such simple diols. Suitable chain-extending agents likewise include ether groups containing diols that conform to the statements made concerning the molecular weight and are obtainable by propoxylation and/or ethoxylation of difunctional starter molecules of the kind already mentioned above by way of example.

Suitable chain-extending agents (crosslinkers) likewise include aromatic amines having sterically hindered amino groups, in particular 1-methyl-3,5-diethyl-2,4-diaminobenzene and its technical-grade mixtures with 1-methyl-3,5-diethyl-2,6-diaminobenzene (DETDA) and also 3,5-dimethylthio-2,6-tolyldiamine and 3,5-dimethylthio-2,4-tolyldiamine and mixtures thereof. Miscellaneous mixtures of the chain-extending agents mentioned by way of example can likewise be used. The chain-extending agents are used in the process according to the invention in amounts of 0% to 15% and preferably 4% to 12% by weight, based on the weight of the polyether polyol.

The starting components, i.e. polyether polyol, any water present and any crosslinker present, are preferably used in such amounts as correspond to an isocyanate number of 80 to 120 and preferably 100 to 105.

It is likewise preferable to use further additives, for example physical blowing agents and/or foam stabilizers. All common PU blowing agents are useable as a physical blowing agent, examples being HFC 245-fa and HFC-365mfc, available from Ineos Europe Ltd. In these cases, amounts of 0.5% to 15% by weight, based on the polyol, are preferred. It is likewise possible to use organosilicones as foam stabilizers, for example Tegostab B8719 available from Evonik AG. These foam stabilizers can be used in amounts of 0.3% to 2% by weight, based on the polyol.

In addition, auxiliaries, such as fillers, preferably chalk, quartz flour and/or flame retardants, for example melamine or organic phosphoric esters, can be used. The products concerned are commercially available.

Fillers can be used as auxiliaries in amounts of 0-60% by weight and the flame retardants in amounts of 0-30% by weight.

The PU casting compounds are preferably prepared by reacting the starting materials in the following quantitative ratios:
100 parts polyether polyol
10-80 parts of di- or polyisocyanate
0.05-5 parts of the 0.5-10% solution of iron(III) acetylacetonate dissolved in
at least one diamine or at least one monofunctional polyol
and also 0-5 parts water and/or 0 to 15 parts of chain-extending agent,
wherein 0.5-5 parts water and/or 0 to 15 parts of chain-extending agent are used in the case of PU foam
and 0 parts of water and 0.5 to 15 parts of chain-extending agent are used in the case of compact polyurethane.

Compact polyurethanes may utilize 0-60% by weight of fillers and/or 0-30% by weight of flame retardants as auxiliaries. Water-absorbing compounds can be used in compact poly-urethanes, such as Zeolithe (Grace) for physical absorption or p-Toluene-sulfonylisocyanate (OHG Borches GmbH) or orthoformiates (OHG Borches GmbH) for Chemical absorption.

Polyurethane foams may utilize 0.3% to 2% by weight of foam stabilizers, 0.5% to 15% by weight of physical blowing agents (additives), 0-60% by weight of fillers and/or 0-30% by weight of flame retardants as auxiliaries.

The reaction to form the polyurethane casting compounds of the invention preferably takes place in the presence of water and/or chain-extending agent and preferably with the following order of addition:

Polyether polyol is initially charged. The Fe(III)Acac dissolved in at least one diamine or at least one monofunctional polyol is stirred into the initially charged and pre-heated polyether polyol, thereafter water and/or chain-extending agent are added if used, followed by the addition of di- or polyisocyanate.

Customary measuring and metering devices are used in this. It is likewise preferable to add the starting materials with stirring.

In the case of the presence of further additives and/or auxiliaries these are preferably added prior to the addition of the di- or polyisocyanate.

The temperature of the reaction components (polyisocyanate component and polyol component) is generally within the temperature range from 20 to 50° C.

The present invention accordingly also provides a process for preparing the polyurethane casting compounds of the invention wherein the initially charged polyether polyol, which is preferably heated to a temperature of 50° C., has the Fe(III)Acac dissolved in at least one diamine or at least one monofunctional polyol stirred into it and, after the metered addition of water and/or chain-extending agent, the di- or polyisocyanate is added.

Customary measuring and metering devices are used in this. It is likewise preferable to add the starting materials with stirring.

When the polyurethane casting compounds of the invention are prepared in the form of foams, the initially charged polyether polyol has the Fe(III)Acac dissolved in at least one diamine or at least one monofunctional polyol stirred into it and, after the metered addition of water and/or chain-extending agent, the di- or polyisocyanate is added.

When the polyurethane casting compounds of the invention are prepared in the form of compact polyurethane compounds, the initially charged polyether polyol has the Fe(III)Acac dissolved in at least one diamine or at least one monofunctional polyol stirred into it and, after the metered addition of chain-extending agent, the di- or polyisocyanate is added.

In both the aforementioned processes, the aforementioned additives and auxiliaries can also be added in the course of the reaction, i.e. 0-60% by weight of fillers and/or 0-30% by weight of flame retardants in the case of compact polyurethanes and 0.3% to 2% by weight of foam stabilizers, 0.5% to 15% by weight of physical blowing agents (additives), 0-60% by weight of fillers and/or 0-30% by weight of flame retardants as auxiliaries in the case of polyurethane foams. This preferably takes place prior to the addition of the di- or polyisocyanate.

The temperature of the reaction components (polyisocyanate component and polyol component) is generally within the temperature range of 20 to 50° C. Temperatures of 40-50° C. are particularly preferred.

The invention further provides for the use of the polyurethane casting compounds, more particularly in the form of foams, in the building sector, more particularly in the sector of road building, particularly preferably in the sector of track building and for the rail beds.

In use, the polyurethane casting compounds according to the invention, in addition to the enhanced weather resistance, outside and behind window glass, also display enhanced light resistance. As a result, they can be used both outdoors and behind window glass.

The examples which follow serve to elucidate the invention without any limitation being implied.

OPERATIVE EXAMPLES

The starting materials listed in Table 1 were used to prepare 4 different PU casting compounds.

Polyol A was a 1:1 mixture formed from a bifunctional polyether polyol with a trifunctional polyether polyol with OH number between 20 and 50 and additionally containing 7% by weight of 1,4-butanediol.

TABLE 1

| Materials used for sample No. | 1 (VV) | 2 (E) | 3 (E) | 4 (VV) |
|---|---|---|---|---|
| Polyol A | 98 | 98 | 98 | 98 |
| Kosmos ® EF tin(II) ricinoleate (pure material) | 0.5 (0.5) | | | 0.4 (0.4) |
| PEG M 500 with 3% Fe(III)Acac (active content) | | 0.734 (0.02202) | | |
| Ethacure ® 420 with 6% Fe(III)Acac | | | 0.4 (0.024) | |
| Water | 0.3 | 0.3 | 0.3 | 0.3 |
| Desmodur ® PF | 57.9 | 57.9 | 57.9 | 57.9 |

All particulars are in pphp=parts per 100 parts of polyol

The following abbreviations were used:

PEG M 500=polyethylene glycol monomethyl ether, MW 500 from Clariant International Ltd.

Ethacure® 420=N,N'-bis(secbutylamino)diphenylmethane, from Albemarle Corp.

Kosmos® EF tin(II) ricinoleate (pure material), obtained from Evonik Goldschmidt GmbH Fe(III)Acac=iron(III) acetylacetonate obtained from Chemikalienhandel.

Desmodur® PF=modified pure 4,4'-diphenylmethane diisocyanate (MDI) with about 23% NCO VV=comparative test, E=according to invention The 4 PU casting compounds were prepared as follows:

Polyol A was initially charged to a stirred beaker and heated to 50° C. Kosmos® EF, PEG M 500 with 3% Fe(III)Acac or Ethacure® 420 with 6% Fe(III)Acac were then stirred in, depending on the sample number, followed by the metered addition of water. These mixtures were subsequently stirred for about 30 seconds. This is followed by the addition of hot Desmodur® PF at 40° C. and subsequent stirring for about 5 seconds. It takes a further 5-10 seconds for the frothing up to start. After about 1 minute, the foam has reached its maximum height. To fully cure the foam, the samples were stored at 80° C. in a drying cabinet for about 1 hour and cut into slices having the dimensions (height: about 80 mm, width: about 60 mm and thickness: about 7 mm) for the ageing test described hereinbelow.

The PU materials of construction were subjected to the following weathered ageing test typical for automotive applications, see Table 2:

In the test, the slice was about half covered with aluminium foil.

TABLE 2

| Conditions of ageing test wherein a 102 minute dry period constantly alternates with an 18 minute shower period for 355 h total test time. UV ageing | |
|---|---|
| Apparatus | Xenotest ® Alpha LM |
| Exposure time | 355 h |
| Irradiation power | 60 W/m$^2$ |
| Black panel temperature | 65° C. |
| Test chamber temperature | 38° C. |
| Relative humidity | 50% |

Following the 355 h test period, all 4 specimens were discoloured and surface harshened, but had not as yet shed any substance.

The harshened region was easily scratched off. The amount of harshened foam scratched off was weighed and divided by the area concerned.

| Sample No. | 1 (VV) | 2 (E) | 3 (E) | 4 (VV) |
|---|---|---|---|---|
| Rub-off loss mg | 122 | 15 | 25 | 160 |
| Irradiated area cm$^2$ | 23.65 | 24.6 | 21.96 | 25.01 |
| Spec. loss mg/cm$^2$ | 5.16 | 0.61 | 1.14 | 6.40 |

Total loss of tin cat: 11.56 (5.16+6.4)
Total loss of Fe(III)Acac: 1.75 (0.61+1.14)

The quantity of Fe(III)Acac lost on weathering only amounts to about 15% of the tin ricinoleate lost.

The catalytic effect was good. A weathering test with foam thus prepared surprisingly produced a significantly better result than a comparative foam prepared with a tin catalyst.

What is claimed is:

1. Polyurethane casting compounds obtained by the reaction of
   100 parts of at least one polyether polyol,
   10-80 parts of at least one di- or polyisocyanate in the presence of
   0.05-5 parts of the 0.5-10% solution of iron(III) acetylacetonate dissolved in
   at least one diamine selected from the group consisting of N,N'-bis(secbutylamino)diphenylmethane and those according to the formula NHR—R'—NHR",
   where R and R"=methyl, ethyl, propyl; R and R" can each be the same or different;
   and R'=C$_1$-C$_{18}$-alkylene-, C$_6$-arylene-C$_{12}$-arylene or C$_7$-C$_{13}$-alkyarylene,
in the presence or absence of water and/or at least one chain-extending agent.

2. Polyurethane casting compounds according to claim 1, characterized in that the polyether polyol comprises bi-/tri- or polyfunctional polyether polyols having an OH number in the range from 20 to 85 and a molecular weight in the range from 2000 to 10 000.

3. Polyurethane casting compounds according to claim 1, characterized in that di- or polyisocyanate is selected from the group consisting of tolylene diisocyanate (TDI), diphenylmethane diisocyanate (MDI), polymeric diphenylmethane diisocyanate (PMDI), aliphatic isocyanate, 4,4'-diisocyanatodicyclohexylmethane (H12MDI), and at least one isocyanate based on hexamethylene diisocyanate (HMDI) or isophorone diisocyanate (IPDI).

4. Polyurethane casting compounds according to claim 1, characterized in that N,N'-bis(secbutylamino)diphenylmethane is used as diamine.

5. Polyurethane casting compounds according to claim 1, characterized in that they additionally contain at least one physical blowing agent and/or a foam stabilizer and/or further auxiliaries and/or additives.

6. Polyurethane casting compounds obtained by the reaction of
   100 parts of at least one polyether polyol,
   10-80 parts of at least one di- or polyisocyanate in the presence of
   0.05-5 parts of the 0.5-10% solution of iron(III) acetylacetonate dissolved in
   at least one monofunctional polyether wherein the monofunctional polyol comprises polyethylene glycol mono-C$_1$-C$_{18}$-alkyl ether and/or polyethylene/polypropylene glycol mono-C$_1$-C$_{18}$-alkyl ether,
in the presence or absence of water and/or at least one chain-extending agent.

* * * * *